Patented June 11, 1940

2,203,789

UNITED STATES PATENT OFFICE 2,203,789

MEASURING APPARATUS

Clarence Johnson, East Cleveland, Ohio, assignor to Bailey Meter Company, a corporation of Delaware Application July 6, 1935, Serial No. 30,057
Renewed April 5, 1938

18 Claims. (Cl. 73—233)

This invention relates to apparatus for measuring the magnitude of a variable quality, quantity, condition, relation, etc., and particularly such variables as speed, temperature, pressure, rate of fluid flow, etc., although the variable may be of any physical, chemical, electrical, hydraulic, thermal, or other nature or characteristic.

One object is to provide a device differentiating an indication of quantity to produce a record and/or indication of rate.

A further object is to provide a device of the type described which is adapted to produce such a record and/or indication adjacent to, or remotely at a considerable distance from the actuator.

Another object is to provide a device for producing a record, indication, or integration of the speed of a body.

Still another object is to provide an electrically actuated device of the type described.

Further objects will be apparent from the description and from the drawings in which:

Fig. 3 is a diagrammatic illustration of a modified form of my invention.

I have chosen to illustrate and will describe my invention as applied to the measurement of the rate of flow of a fluid. As known, the total volume of fluids, such as alcohol, benzol, fuel oil, molasses, paint, or the like, passing through a conduit in a given length of time, are conveniently and accurately measured by positive displacement meters which have as a primary element a chamber or chambers through which the fluid passes in successive isolated quantities, either weights or volumes. These quantities may be separated from the stream and isolated by alternate filling and emptying containers of known capacity and fluid cannot pass through without actuating the primary device. The secondary element of such a meter normally consists of a counter with suitably graduated dials for indicating the total quantity that has passed through the meter up to the time of reading. It is frequently desirable, however, that an indication or record of the instantaneous rate of flow of such fluid be available, and my invention contemplates a device producing such a record and/or indication actuated by the shaft of the registering gear train or any other suitable shaft within the displacement meter.

Figure 1:
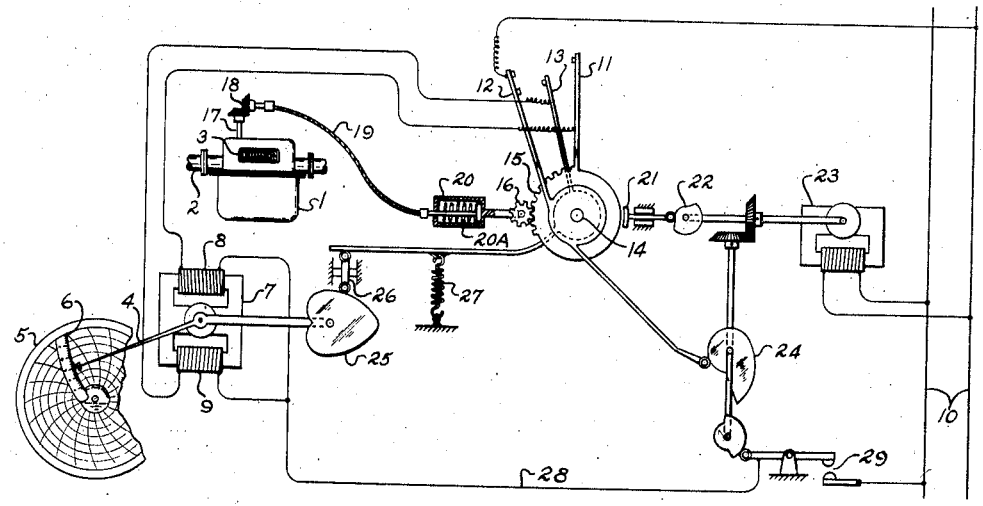
Fig. 1 is a diagrammatic illustration of an embodiment of my invention.

Referring to Fig. 1, I have therein shown a positive displacement meter 1 positioned in a pipe or conduit 2 for measuring the flow of fluid therethrough. The meter 1 may be provided with a suitable secondary device such as a register 3, from which the total flow passing through the pipe 2 up to the time of reading may be ascertained.

To record and/or indicate the rate of flow of fluid through the conduit 1 I provide a suitable exhibiting means as a pen arm 4 cooperating with a suitably graduated time rotatable chart 5 to give a permanent visible record of the rate of flow. Likewise cooperating with the pen arm 4 is an index or graduated scale 6, which provides an indication of the rate of flow existing at the instant of observation.

Throughout the specification and the appended claims, it is intended that exhibiting means shall denote any device or combination of devices for displaying in one or more forms the magnitude or other quality of the variable being measured. Thus it may denote a pointer which will provide an indication by observation of its movement or position with reference to a chart or graduated scale, or a device providing a permanent visible record of such indication, or a device providing an indication of the total flow up to the time of reading, or any desired combination of such devices.

The arm 4 is positioned by a reversible motor 7 having opposed fields 8 and 9 adapted to be energized from a suitable source 10.

Energization of the field 8, for positioning the pen arm 4 in one direction, is effected through engagement of a contact arm 11 with a contact structure 12; and energization of the field 9, for positioning of the pen arm 4 in opposite direction, is effected through engagement of a contact arm 13 with the contact structure 12. When the fields 8 and 9 are equally energized or deenergized the motor 7 remains stationary.

The contact arm 11 is rotatably mounted on a fixed shaft 14, and is provided with a toothed hub 15 meshing with a pinion 16 driven by an extension 17 of a gear train or other suitable shaft within the meter 1, rotating at a speed dependent upon the rate of flow of fluid through the conduit 2. The pinion 16 is shown as being driven from the extension 17 through bevel gears 18 and a flexible shaft 19, although any suitable driving connection may be employed.

Interposed in the driving connection 19 is a friction means 20 wherein the shaft 19 is actually broken but the two parts held in frictional engagement by means of a spring 20A, to the end that if the part of the shaft 19 connected to the pinion 16 is locked, or held against rotation, the friction means will slip, allowing the extension 17 to continue to rotate the shaft 19.

The arm 11 is periodically locked or held against rotation by means of a brake member 21 intermittently urged against the hub 15 by a cam 22 rotated by a constant speed motor 23. The arrangement is such that the contact arm 11 is periodically, for constant increments of time, allowed to advance from an initial position, in a counter-clockwise direction as shown in the drawings and then locked against rotation by the extension 17 through the agency of the brake member 21. As the contact arm 11 is advanced by the extension 17 the periodic displacement from the initial position will be proportional to the rate of flow of fluid through the conduit 2.

Subsequent to each advancement, the contact arm 11 is returned to the initial position against the action of the brake member 21 by the contact structure 12 rotatably mounted on the shaft 14 and periodically oscillated by a cam 24 rotated by the motor 23. Upon engagement of the contact structure 12 with the contact arm 11, the field 8 will be energized to position the pen arm 4 in one direction. Accordingly so much of the apparatus as has been described will function to periodically position the pen arm 4 in one direction by increments bearing a functional relation to the rate of flow of fluid through the pipe 2. Such positioning of the pen arm 4 may be in direct proportion to the rate of flow of fluid through the pipe 2 or may bear any desired functional relation thereto by proper shaping of the cam 24 as will be understood by those familiar with the art.

So that the pen arm 4 will be positioned in accordance with changes in the rate of flow of fluid through the pipe 2 the contact arm 13 rotatably mounted on the shaft 14 is shown adapted to be positioned by a cam 25 through a follower 26. The cam 25 is operated in unison with the pen arm 4 by the motor 7 and accordingly the contact arm 13 assumes a position in accordance with the position of the pen arm 4. As the arm 13 is periodically carried from the cam follower 26 by the contact structure 12 in returning the arm 11 to the initial position it is yieldably urged against the cam 25 by a spring 27.

Engagement of the contact structure 12 with the arm 13 effects energization of the field 9 to position the pen arm 4 in opposite direction to that caused by energization of the field 8. The contact structure 12 in periodically advancing to return the arms 11 and 13 to the initial position in effect compares the actual rate of flow through the conduit 2 to that indicated or exhibited by the arm 4; and if the former has changed between such periodic advances, corrects the latter until it is again in agreement. So long as such agreement exists no change is made in the position of the arm 4.

The operation of the apparatus is cyclic, and assuming the parts to be in the position shown in Fig. 1, the contact arm 11 will advance from the initial position in which it is shown for an increment of time determined by the shape of the cam 22, which at the termination of the increment will urge the brake member 21 against the hub 15. During the advance of the contact arm 11 the contact structure 12 will remain stationary, due to the shape of the cam 24. Likewise the contact arm 13 will remain stationary as the fields 8 and 9 of the motor 7 are both open-circuited. Immediately subsequent to the advance of the contact arm 11 from the initial position, the contact structure 12 will be rotated in a clockwise direction by the cam 24. Upon the contact structure 12 engaging the contact arm 13 the field 9 of the motor 7 will be energized tending to position the pen arm 4 in one direction. Likewise upon the contact structure 12 engaging the contact arm 11, the field 8 will be energized tending to position the pen arm 4 in opposite direction. If the contact structure 12 engages the contact arms 11 and 13 simultaneously the pen arm 4 will remain stationary. If the contact arm 11 in its incremental advance is displaced beyond the contact arm 13, indicating that the actual rate of flow of fluid through the conduit 2 is greater than that indicated by the pen arm 4, engagement will take place between the contact structure 12 and contact arm 11 effecting energization of the field 8 and operating the pen arm 4 to indicate an increase in the rate of flow. Simultaneously the contact arm 13 will be positioned in proportion to the movement of the arm 4 in a counter-clockwise direction through the cam 25 and follower 26. Positioning of the pen arm 4 will continue until the contact structure 12 engages the contact arm 13, when both fields will be equally energized and the motor 7 not urged to rotation. Conversely, upon the rate of flow of fluid through the pipe 2 decreasing, the contact arm 11 will not advance to a position coincident with that of the contact arm 13 and accordingly the contact structure 12 will engage the contact arm 13 before engaging the contact arm 11. Such engagement will effect energization of the field 9 positioning the pen arm 4 in a direction to indicate a decrease in the rate of flow and simultaneously positioning the contact arm 13 in a clockwise direction. Such positioning will continue until the contact structure 12 engages the contact arm 11, when both fields will become energized. Such incremental positioning of the arm 4 will continue during each cycle of operation until upon advancing, the contact structure 12 simultaneously engages the contacts 11 and 13. The apparatus therefore functions to compare the actual rate of flow as indicated by the angular position of the contact arm 11 at the termination of its incremental advance, with the rate of flow shown by the pen arm 4 as indicated by the angular position of the contact arm 13; and then to periodically adjust the position of the pen arm 4 by increments proportional to the difference in angular positions of the contact arms 11 and 13 until the showing of the pen arm 4 agrees with the actual rate of flow.

After the contact structure 12 has returned the contact arm 11 to the initial position, the shape of cam 24 permits the quick return of the contact structure 12 to the position shown in Fig. 1, thereby effecting substantially simultaneous deenergization of the fields 8 and 9. The contact arm 13 follows the contact structure 12 in its quick return however, until again engaging the cam follower 26. To avoid the possibility of a continuing energization of the field 9 effecting a positioning of the pen arm 4, I show the fields 8 and 9 connected to the source 10 through a common connector 28. The circuit through the connector 28 is adapted to be broken by a switch 29 operated from the motor 23 at some predetermined point in the travel of the arms 11, 13 and contact structure 12 toward the initial position and to maintain the circuit open until the contact structure 12 has returned to the starting position and is again starting to move toward the arms 11 and 13. Accordingly, regardless of the fact that the contact arm 13 may remain in engagement with the contact structure 12 during a portion of its quick return, the field 9 will be deenergized and the pen arm 4 remain stationary.

Figure 2:
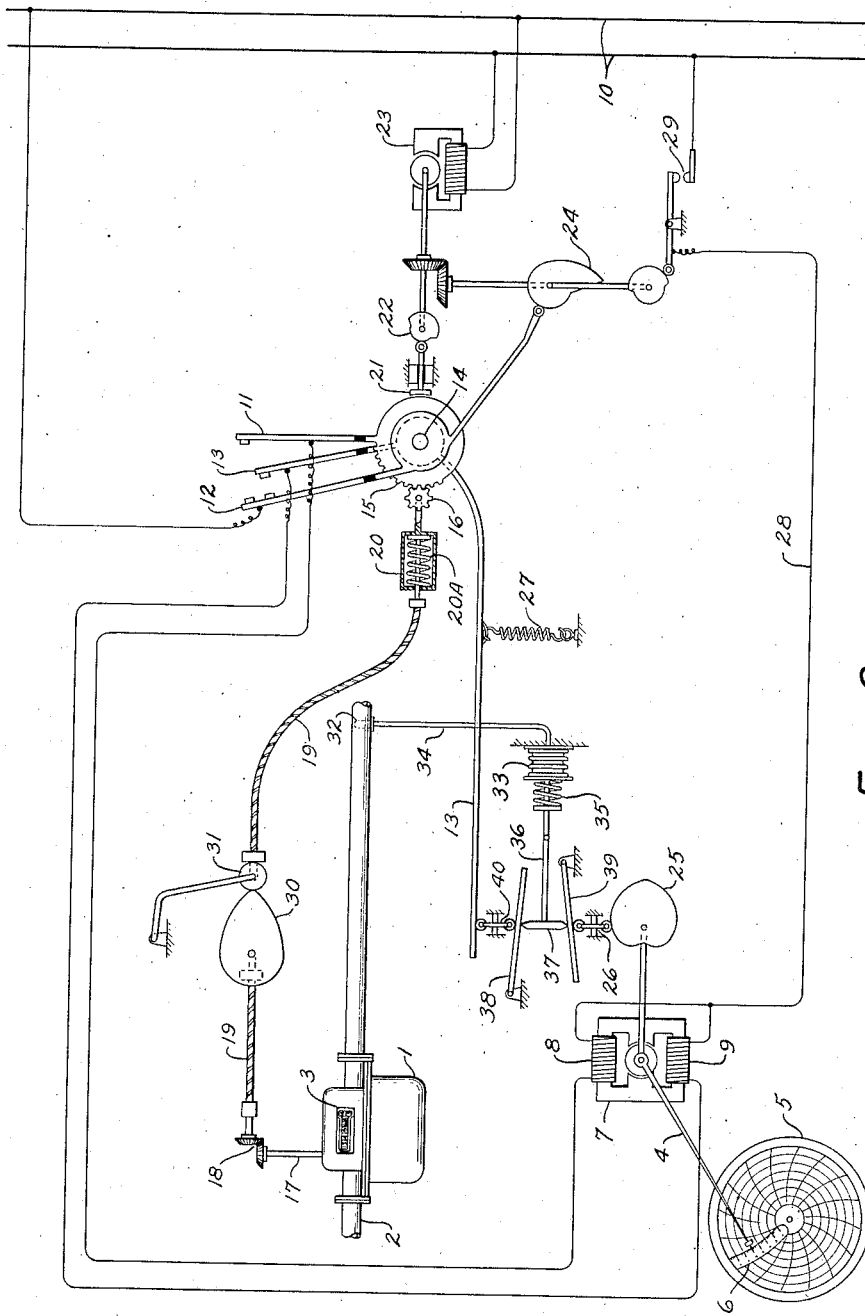
Fig. 2 illustrates an embodiment of my invention similar to that illustrated in Fig. 1 in which are incorporated certain compensating devices.

In case the structure of the meter 1 is such that the speed of the extension 17 varies from strict linear proportionality, within a revolution, from the rate of flow of fluid through the pipe 2, I may interpose in the shaft 19 a driving cam 30 and a pivotally supported cam follower 31 as shown in Fig. 2. The cam 30 may be so shaped that regardless of variations in angular speed of the extension 17 during one revolution the follower 31, and accordingly the pinion 16, will rotate at constant speed for a given rate of flow through the pipe 2.

The displacement meter 1 may be arranged so that the speed of the extension 17 is proportional to the rate of volume flow through the pipe 2, whereas it may be desired to record the rate of flow in units of weight or units of volume under certain prescribed conditions, such as predetermined values of pressure and temperature. Variation in such conditions from the prescribed values will affect the specific volume of the fluid and accordingly the apparent flow as shown by the exhibiting means will deviate from the actual flow in units of weight, proportional to the extent of variations of such conditions from the prescribed values. In Fig. 2 I have shown a device for compensating for variations in such conditions from the prescribed or predetermined values.

Positioned in the pipe 2 is a temperature sensitive bulb 32 connected to an expansible-contractible bellows 33 by a capillary 34. As known, the system may be filled with a gas, vapor or liquid so that upon an increase in temperature of the fluid within the pipe 2 the bellows 33 will expand against the force of a spring such as I have indicated at 35 to position a pivotally connected member 36 carrying a double knife edge 37 interposed between pivoted members 38 and 39, arranged substantially parallel when zero rate of flow obtains through the pipe 2. Vertical motion of the cam follower 26 is transmitted to the contact arm 13 through the pivoted members 38 and 39, double knife edge 37 and a reciprocatable member 40. The arrangement is such that at zero rate of flow when the pivoted members 38 and 39 are parallel, the double knife edge 37 may be positioned without producing angular displacement of the contact arm 13. When, however, flow exists through the pipe 2 the member 39 will assume a non-parallel relation with respect to the member 38, due to the positioning of the cam follower 26. Accordingly movement of the double knife edge 37 will produce an angular positioning of the contact arm 13. By proper proportioning of the parts I may cause positioning of the double knife edge 37 to effect an angular positioning of the contact arm 13 in direct proportion to the correction necessary for changes in temperature of the fluid flowing through the pipe 2 from the prescribed values.

Thus for example, upon the flow through the pipe 2 increasing, the member 39 will be positioned in a counter-clockwise direction a proportionate amount whereas the member 38 will be positioned in a clockwise direction a proportionate amount, effecting a counter-clockwise positioning of the contact arm 13 until the contact structure 12 engages the contact arms 11 and 13 at the same instant. Upon the temperature of the fluid within the pipe 2 increasing, causing the extension 17 to rotate more rapidly and effect a greater displacement of the contact arm 11 during the periodic advances which without proper compensation would cause the arm 4 to exhibit a greater flow than actually exists, the double knife edge member 37 will be positioned a proportionate amount to the left as viewed in the drawing, causing a corresponding counter-clockwise positioning of the contact arm 13. The contact structure 12 will upon the next reciprocation accordingly engage the contact arm 12 prior to the contact arm 11, causing a positioning of the pen arm 4 an amount sufficient to correct for the apparent increase in flow caused by the increase in temperature. The converse will occur upon a decrease in temperature, the contact arm 13 being positioned in a clockwise direction, effecting a proportionate upward positioning of the pen arm 4, due to the contact structure 12 engaging the contact arm 11 prior to the contact arm 13.

In Fig. 3 I have shown a modified form of my invention so arranged that the exhibiting means may be located remotely from the actuator or transmitter. Therein the contact arm 11 periodically advances from an initial position and is subsequently returned thereto by the contact structure 12. Engagement of the contact structure 12 with the contact arm 11 serves to periodically energize the field 8 of the reversible motor 7 which may be located remotely. As the displacement of the contact arm 11 from the initial position is proportionate to the rate of flow, the time lengths of such periodic energization will accordingly be dependent upon or may be directly proportional to the rate of flow by proper shaping of the cam 24.

The field 9 is adapted to be periodically energized for increments of time proportional to the position of the pen arm 4. By proper synchronization of the incremental energizations of the fields 8 and 9, the position of the pen arm 4 is in effect compared to the actual rate of flow through the pipe 2, and if not correct then through the incremental energizations is brought into proper agreement. When the pen arm 4 is in proper agreement, the incremental energizations of the fields 8 and 9 originate at the same instant, so that the pen arm 4 remains stationary. When the flow through the pipe 2 increases, the incremental energization of the field 8 will originate prior to the energization of the field 9, effecting a proportionate upward positioning of the pen arm 4, periodically continuing until proper agreement is reestablished. Conversely upon the flow decreasing, energization of field 9 will originate prior to energization of field 8, effecting a proportionate downward positioning of the pen arm 4 periodically continuing until proper agreement is reestablished.

For periodically energizing the field 9 for increments of time proportional to the position of the pen arm 4 I show a beam 41, one end of which is periodically reciprocated by a cam 42 rotated by a synchronous motor 43. The opposite end of the beam 41 is positioned by the motor 7 through a link 44, and therefore assumes a position in a vertical plane proportional to the position of the pen arm 4. Carried by the beam 41 at a point intermediate its ends is one-half the contact 45 and reciprocation will accordingly effect periodic closure thereof for increments of time proportional to the position of the pen arm 4. The contact 45 is connected to the source 10 through a conductor 46 and to the field 9 through a conductor 47.

The operation of the cam 42 may be so synchronized with the operation of the cam 24 that the reciprocation of the beam 41 and contact structure 12 will be in phase throughout each cycle of operation. Accordingly when the position assumed by the beam 41 through the motor 7 is proportional to the displacement of the contact arm 11 at the termination of the incremental advance, engagement of the contact structure 12 with the contact arm 11 will occur simultaneously with closure of the contact 45, thereby simultaneously energizing the fields 8 and 9 so that the motor 7 is not urged to rotation. A decrease in the rate of flow through the pipe 2 however will cause a decrease in the displacement of the contact arm 11 from the initial position during the incremental advance and accordingly upon the next cycle of operation the closure of the contact 45 will occur before engagement of the contact structure 12 with the contact arm 11, thereby causing energization with the field 9 previous to energization of the field 8 and producing a positioning of the pen arm 4 in a downward direction proportionate to the decrease in the rate of flow through the conduit 2. Such incremental positioning will continue until the beam 41 through the link 44 has been positioned so that closure of contact 45 occurs simultaneously with the engagement between contact structure 12 and arm 11. Upon the rate of flow through the pipe 2 increasing the converse will occur, the contact structure 12 engaging the contact arm 11 previous to the closure of the contact 45, thereby effecting energization of the field 8 previous to energization of the field 9, and causing the pen arm 4 to be positioned in an upward direction.

To provide simultaneous deenergization of the fields 8 and 9 at a selected point in the cycle of operation a switch 48 actuated by the motor 43 through a cam 49 and follower 50 is interposed in the common conductor 28, leading to the fields 8 and 9 from the source 10. The cam 49 may be arranged to maintain the fields energized during a desired portion of the half cycle when the beam 41 is moving downward and the contact structure 12 moving toward the contact arm 11. Previous to the beam 41 moving upwardly and the contact structure 12 returning to the starting position, the contact 48 will break, thereby simultaneously breaking the circuit to the fields 8 and 9. Operation of the exhibiting or receiver means is thereby inhibited for a portion of each impulse originating in the transmitter.

With the mechanism and system so far described the remote indicating and/or recording is dependent upon the cams 24 and 42 remaining in synchronism and in proper phase relationship to each other during each cycle of operation. While the motors 23 and 43 may be of the synchronous type insuring correct operation of the cams after once placed in proper relation, I provide means for checking synchronism and for reestablishing such synchronism and proper phase relationship after a momentary or prolonged stoppage of power to one of the motors.

The motor 23 is connected directly to the power line 10. One terminal of the motor 43 is connected through the conductor 46 to the power source 10, whereas the other terminal is connected in parallel through a conductor 52 to a normally close-circuited contact 53 and a normally open-circuited contact 54. By normally so I mean that when normal operation occurs with the motors 23 and 43 in synchronism the contact 53 will be close-circuited, while the contact 54 will be open-circuited, and vice versa. The opening and closing of the contact 53 is controlled by the cam 49 and that of the contact 54 by a cam 55 driven at a uniform speed by the motor 23.

It will be seen that with such an arrangement the motor 43 is in continual rotation for during a portion of the cycle of rotation of the cam 49 the contact 53 is closed, thus energizing the motor 43, while during the remainder of the cycle the contact 54 is closed while the contact 53 is open, thus resulting in a continual rotation of the motor 43.

If, however, the source 10 is momentarily deenergized, causing the motor 43 to stop, then when power is again available the staggering of the closure of contacts 53 and 54 will not be exact as previously and rotation of the motor 43 will pause for a short interval during each cycle of rotation of the cam 42, until it is again brought into phase with the motor 23. The number of revolutions of the cam 42 which will occur before rephasing and resynchronization is accomplished, depends upon how far out of phase the cams 42 and 24 are at the time power is again made available at the motor 43.

The apparatus shown in Fig. 3 may be arranged to provide for remote integration of the rate of flow through the pipe 2. Therein I have shown a register 56 from which the total flow between successive readings may be obtained. The register 56 is driven by a synchronous motor 57 having opposed fields 58 and 58A. The field 58A is shown connected directly across the source 10 so that when the field 58 is deenergized the register will advance at a constant speed.

The field 58 has one terminal connected directly to one side of the source 10 and the other terminal connected to the opposite side through the contact structure 12 and contact arm 11. During the period of each cycle of operation when the contact arm 11 is in engagement with the contact structure 12 the field 58 will be energized and the register 56 will remain stationary. During the period of each cycle of operation when the contact structure 12 is disengaged from the contact arm 11, however, the field 58 will be deenergized and the register 56 will advance at a constant rate of speed. As the period of engagement of the contact structure 12 with the arm 11 is proportional to the rate of flow through the conduit 2, and as the time lengths of the cycles of operation are equal, it follows that the periods of time during which the register 56 advances will likewise be proportional to the rate of flow; and that by the provision of proper gears or suitable multiplying factors the register 56 will give the total flow between successive readings in desired units such as pounds, gallons, cubic feet, or the like.

While I have shown the register 56 provided with opposed fields it is apparent that correct operation will also be obtained if a single field is provided, periodically energized through engagement of the contact structure 12 with the arm 11.

Certain features of my invention, disclosed but not claimed herein, are disclosed and claimed in my divisional application Serial No. 307,103, filed in the United States Patent Office December 1, 1939.

What I claim as new, and desire to secure by Letters Patent of the United States, is:

1. Apparatus comprising a first member periodically for constant increments of time advanced from an initial position at a rate proportional to the value of a variable, an actuating device, a second member positioned by said actuating device, and means for returning said first and second members to the initial position at a constant rate of speed subsequent to each advancement; said actuating device being under the joint control of said members and means.

2. The combination with an electro-responsive device having electrically opposed windings, means for controlling the circuit through one of said windings comprising a first contact periodically for constant increments of time advanced from an initial position at a rate proportional to the value of a variable, and a cooperating contact structure serving to return the first contact to the initial position subsequent to each advancement; and means for controlling the circuit through the other of said windings comprising a time responsive element, and a contact member positioned by said electro-responsive device and by said time responsive element.

3. The combination with an electro-responsive device having electrically opposed windings, means periodically energizing the circuit through one of said windings for increments of time proportional to the magnitude of a variable, means operated in synchronism with said first named means periodically energizing the circuit to the other of said windings for increments of time proportional to the position of said electro-responsive device; and means for simultaneously deenergizing the circuit through both of said windings for a portion of each period.

4. In a measuring device, in combination, a plurality of movable members, means effecting synchronous periodic reciprocation of each of said members, an electro-responsive device having electrically opposed windings controlled by said members, and means rendering said members ineffective to control said electro-responsive device during a portion of each reciprocation.

5. Apparatus comprising in combination, an electro-responsive device having electrically opposed windings, a first member periodically for constant increments of time advanced from an initial position at a rate proportional to the value of a variable, a second member positioned by said electro-responsive device, means for returning said first and second members to the initial position at a constant rate of speed subsequent to each advancement; one of said windings being energized during engagement between said means and said first member and the other of said windings being energized during engagements between said means and said second member.

6. Apparatus comprising a first member periodically for constant increments of time advanced along a definite path from an initial position at a rate proportional to the value of a variable, a second member, an actuating device for positioning said second member along said path, means for modifying the positioning of said second member in accordance with the magnitude of a condition of the variable, means for returning said first and second members to the initial position at a constant rate of speed subsequent to each advancement, said actuating device being under the joint control of said members and last named means.

7. In a fluid flow meter, in combination, a contact, means for advancing said contact from an initial position during alternate periods of constant time length at a rate proportional to the rate of flow, an indicator of the rate of flow, a contact member positioned in accordance with the position of said indicator, means for modifying the position of said contact member in accordance with the temperature of the fluid, a cooperating contact structure actuated during successive increments of time at a constant speed for returning said contact and contact member to the initial position; said indicator controlled by the co-action of said contact, contact member and contact structure.

8. In a fluid meter, in combination, a contact, means for advancing said contact from an initial position during alternate periods of constant time lengths at a rate dependent upon the rate of flow of said fluid, a cooperating contact structure actuated during successive increments of time at a constant speed for returning said contact to the initial position, exhibiting means controlled by said contact and structure, and means for varying the speed of said contact to compensate for variations of speed of said contact from proportionality with the rate of flow of fluid.

9. A rate of flow meter, comprising in combination, a displacement meter having a driving shaft rotatable at a speed proportional to the rate of flow of fluid, a driven shaft, friction means connecting said shafts, a brake for periodically locking said driven shaft against rotation by said driving shaft for constant increments of time, an oscillatable contact arm driven in one direction from an initial position by said driven shaft, a mating contact arm, means for periodically driving said mating contact arm at a constant rate of speed to restore said oscillatable contact arm to the initial position while said locking brake is in engagement with said shaft, exhibiting means, and means for controlling said exhibiting means energized by the engagement of said oscillatable contact and mating contact arms.

10. A rate of flow meter, comprising in combination, a displacement meter having a driving shaft rotatable at a speed proportional to the rate of flow of fluid, a driven shaft, friction means connecting said shafts, a brake for periodically locking said driven shaft against rotation by said driving shaft for constant increments of time, an oscillatable contact arm driven in one direction from an initial position by said driven shaft, a mating contact arm, means for periodically driving said mating contact arm at a constant rate of speed to restore said oscillatable contact arm to the initial position while said locking brake is in engagement with said shaft, exhibiting means, a motor having opposed fields for actuating said exhibiting means, a third contact arm positioned along the path of said oscillatable contact arm in accordance with the position of said exhibiting means, engagement of said mating contact arm with said oscillatable contact arm energizing one of said fields, and engagement of said mating contact arm with said third contact arm energizing the other of said fields.

11. Apparatus comprising a first member periodically advanced along a definite path from an initial position at a rate proportional to the value of a variable, a second member, an actuating device for positioning said second member along said path, means for returning said first and second members to the initial position subsequent to each advancement, said actuating device being under the joint control of said members and means.

12. The combination with an electro-responsive device having electrically opposed windings, means for controlling the circuit through one of said windings comprising a first contact periodically advanced from an initial position at a rate proportional to the value of a variable, and a cooperating contact structure serving to return the first contact to the initial position subsequent to each advancement; and means for controlling the circuit through the other of said windings comprising a time responsive element and a contact member positioned by said electro-responsive device and by said time responsive element.

13. Apparatus comprising a first member periodically for constant increments of time advanced along a definite path from an initial position at a rate proportional to the value of a variable, a second member, an actuating device for positioning said second member along said path, means for modifying the positioning of one of said members in accordance with the magnitude of a condition of the variable, means for returning said first and second members to the initial position at a constant rate of speed subsequent to each advancement, said actuating means under the joint control of said members.

14. In a telemetric measuring device, in combination, a transmitting station comprising a movable member, a cam engaging said member having a rising and a falling section, a synchronous motor for rotating said cam to periodically reciprocate said member through a predetermined course, a receiving station comprising a second movable member, a second cam having a rising and a falling section, a second synchronous motor for rotating said second cam to periodically reciprocate said second member through a predetermined course, a motor having electrically opposed windings, the energization of one of said windings under the control of said transmitting member while said transmitting member engages the rising section of said transmitting cam, the energization of the other of said windings under the control of said second member while said second member engages the rising section of the second cam, and means for rendering said members ineffective to control the energization of said opposed windings while said second member engages the falling section of the second cam.

15. In a telemetric measuring system, in combination, a transmitting station comprising a movable member, driving means for periodically reciprocating said member between predetermined limits, a receiving station comprising a second movable member, a second driving means for periodically reciprocating said second member between predetermined limits, a motor having electrically opposed windings, the energization of one of said windings normally under the control of said first named member, the energization of the other of said windings normally under the control of said second member, and means for rendering said members ineffective to control the energization of the opposed windings while said second member is moving in one direction between said predetermined limits.

16. In a system for telemetering a quantity, the combination of circuit means and transmitter and receiver means operatively connected thereto; said receiver comprising a motor, said transmitter comprising means adapted to periodically produce electric impulses energizing the circuit through said motor for increments of time corresponding to the magnitude of said quantity, said motor when energized by said impulses normally adapted to move in one direction; and means to inhibit temporarily for a portion of each impulse the operation of said motor.

17. A telemetric transmitter comprising, a first member, means for periodically advancing said member from an initial position at a rate in accordance with the magnitude of said quantity, a second member, means for periodically effecting engagement between said first and second members to return said first member to the initial position at a constant rate of speed, an electric circuit including said first and second members, engagement and disengagement of said first and second members producing signals in said circuit spaced by a time interval corresponding to the magnitude of said quantity.

18. A telemetric transmitter comprising, a first member periodically advanced from an initial position at a rate in accordance with the magnitude of a quantity, means for periodically returning said member to the initial position subsequent to each advancement, an electric circuit including said member and means, said member and means cooperating to produce electric impulses in said circuit of a time duration corresponding to the magnitude of said quantity.

CLARENCE JOHNSON.